United States Patent
Rueby et al.

(10) Patent No.: US 8,287,072 B2
(45) Date of Patent: Oct. 16, 2012

(54) IMAGE DATA EXPANSION BY PRINT MASK

(75) Inventors: Christopher Rueby, North Chili, NY (US); Douglas W. Couwenhoven, Fairport, NY (US)

(73) Assignee: Eastman Kodak Company, Rochester, NY (US)

(*) Notice: Subject to any disclaimer, the term of this patent is extended or adjusted under 35 U.S.C. 154(b) by 826 days.

(21) Appl. No.: 12/407,130

(22) Filed: Mar. 19, 2009

(65) Prior Publication Data

US 2010/0238219 A1    Sep. 23, 2010

(51) Int. Cl.
*B41J 29/38* (2006.01)
*G06F 15/00* (2006.01)

(52) U.S. Cl. ......... 347/14; 347/6; 347/7; 347/8; 347/12; 347/15; 347/16; 347/17; 347/19; 347/31; 347/37; 347/40; 347/43; 347/44; 347/49; 347/50; 347/55; 347/57; 347/65; 347/86; 347/87; 347/92; 347/96; 347/98; 347/100; 347/106; 358/1.9; 358/1.8; 358/3.01; 358/3.06; 358/3.13; 358/3.14; 358/3.23; 358/535; 358/452; 358/426.1; 382/162; 382/164; 382/165; 382/166; 382/167; 382/135; 382/232

(58) Field of Classification Search .................. None
See application file for complete search history.

(56) References Cited

U.S. PATENT DOCUMENTS

| | | | | |
|---|---|---|---|---|
| 4,967,203 A | * | 10/1990 | Doan et al. | 347/41 |
| 5,992,962 A | * | 11/1999 | Yen et al. | 347/9 |
| 6,464,330 B1 | * | 10/2002 | Miller et al. | 347/40 |
| 6,488,351 B1 | * | 12/2002 | Newkirk et al. | 347/15 |
| 6,776,468 B2 | * | 8/2004 | Miller et al. | 347/9 |
| 7,350,902 B2 | | 4/2008 | Dietl et al. | |
| 7,452,047 B2 | * | 11/2008 | Heydinger | 347/15 |
| 7,469,985 B2 | * | 12/2008 | Noguchi et al. | 347/15 |
| 2003/0081023 A1 | * | 5/2003 | Miller et al. | 347/9 |
| 2006/0250624 A1 | | 11/2006 | Spaulding et al. | |
| 2007/0201054 A1 | * | 8/2007 | Billow et al. | 358/1.8 |
| 2008/0309952 A9 | | 12/2008 | Billow et al. | |
| 2010/0238219 A1 | * | 9/2010 | Rueby et al. | 347/14 |

* cited by examiner

*Primary Examiner* — Steven Kau
(74) *Attorney, Agent, or Firm* — Kevin E. Spaulding

(57) ABSTRACT

A method for using a processor to process image data received from an image data source in preparation for multi-pass printing, comprising multitoning the image data to produce a multitoned image, using the multitone level of a pixel in the multitoned image to select a plane of a print mask, using the location of the pixel in the multitoned image to select a cell of output pixels in the selected plane of the print mask, and copying the selected cell of output pixels to corresponding locations within a print buffer.

13 Claims, 11 Drawing Sheets

IMAGE DATA EXPANSION BY PRINT MASK

CROSS-REFERENCE TO RELATED APPLICATIONS

Reference is made to commonly assigned, co-pending U.S. patent application Publication No. 2010023851 published Sep. 23, 2010, entitled "EFFICIENT IMAGE PRINTING WITH MULTIPLE-SIZED DOTS" by David Neese, the disclosure of which is incorporated herein.

FIELD OF THE INVENTION

This invention relates generally to the field of image processing prior to printing, and more particularly to an efficient way of handling image data for a printing system capable of printing an image in multiple passes.

BACKGROUND OF THE INVENTION

Many types of printing systems include one or more printheads that have arrays of marking elements that are controlled to make marks of particular sizes, colors and densities in particular locations on the print media in order to print the desired image. In some types of printing systems, the array of marking elements extends across the width of the page, and the image can be printed one line at a time. However, the cost of a printhead that includes a page-width array of marking elements is too high for some types of printing applications, so a carriage printing architecture is often used.

In a carriage printing system such as a desktop printer, or a large area plotter, the printhead or printheads are mounted on a carriage that is moved past the recording medium in a carriage scan direction as the marking elements are actuated to make a swath of dots. At the end of the swath, the carriage is stopped, printing is temporarily halted and the recording medium is advanced. Then another swath is printed, so that the image is formed swath by swath. In a carriage printer, the marking element arrays are typically disposed along an array direction that is substantially parallel to the media advance direction, and substantially perpendicular to the carriage scan direction. The length of the marking element array determines the maximum swath height that can be used to print an image.

In single-pass printing, each marking element that is used for printing is responsible to print all pixel locations that are required in a corresponding raster line of the image swath. After printing the swath, the page is advanced by a distance corresponding to the length of the marking element array and the next swath is printed, again with each marking element being responsible to print all pixel locations that are required in the corresponding raster line of that image swath. Single pass printing has the advantage of fast print throughput, and is frequently used in draft printing modes. However, in practice, marking elements are often non-uniform in a variety of ways. For example, they can produce nonuniform dot sizes on the recording medium. They can also be misdirected such that the dot location is displaced from its intended location, or they can be defective such that no dot at all is produced. Such nonuniformities often produce objectionable image quality defects such as banding in single-pass printing. In addition, it is well known in the field of inkjet printing that if ink drops placed at neighboring locations on the page are printed at the same time, then the ink drops tend to flow together on the surface of the page before they soak into the page. This can give the printed image an undesirable appearance often referred to as coalescence. Coalescence decreases as the time delay between printing adjacent dots increases, thereby improving image quality.

In multi-pass printing, responsibility for printing each raster line of the image is shared between a plurality of marking elements. In this way the nonuniform marking behavior of marking elements can be disguised in order to provide improved image quality by reducing the visibility of artifacts such as banding. Multipass printing can provide time for improving the uniformity of ink-media interactions by controlling the number and pattern of dots that can be printed within one pass, thereby reducing coalescence. Multipass printing can also enable multitone printing in which multiple dots are printed in the same pixel locations. Multipass printing is described in more detail in commonly assigned co-pending U.S. Patent Application Publication No. 2008/0309952.

In order to ensure that each pixel location of the image can be printed during at least one of the P passes in a multipass print mode, a print mask is provided for each color plane of the image. The print mask is typically a two dimensional array of rows and columns of Boolean data. Each row of the print mask contains 1's and 0's for each corresponding marking element in the marking element array indicating which pixel locations are authorized for printing by that marking element during the printing of a swath of data. In other words, Typically, a logical AND operation is applied between the print mask data and the image data in order to indicate which pixel locations are to be printed by each marking element in a given print swath. For single-tone P-pass printing (where each pixel location can receive one and only one dot during the printing of the P passes), the print mask is composed of P mask sections, where each mask section includes complementary mask data, such that each row of data in one mask section is complementary to corresponding rows in the other mask sections. The sum of the complementary mask data is 1 for each pixel location for single-tone printing, so that each pixel location can be printed in one and only one of the P passes. For printing systems designed to print up to Q dots in each pixel location (where Q is greater than 1) in P passes, the print mask is still composed of P mask sections, but the sum of the complementary print mask data can be as large as Q for each pixel location.

Image data is typically provided to a printing system in the form of RGB data files that describe the color of each pixel of the image in terms of an amount of each of the additive primary colors (red, green and blue). For each of the three primary colors, 256 levels (8 bits) per pixel are generally provided to specify the amount.

Printing systems typically print with the subtractive colors cyan, magenta and yellow, and optionally black. Thus, image data needs to be converted from ROB color space to CMYK color space. In addition, many types of printing systems, such as inkjet printers, provide discrete dots of color in specified locations on paper or other recording medium. In binary printing, a dot of cyan, magenta, yellow or black is either printed in a given pixel location or not. In multipass printing, it is possible to print more than one dot of a particular color at a particular location. Additionally, some printers are capable of printing with inks of different densities (e.g. light cyan and dark cyan) or different dot sizes. In any case, the available number of colorant levels per dot location on the printed page is typically far less than the 256 levels per primary color provided in the input image data. Furthermore, the number of pixels in an input data image might be on the order of a few million. The number of available output dot locations for a printing system depends on both the printing resolution and the size of the recording medium. For an image printed by a desktop printer, the number of output dot locations can be on the order of a hundred million. For an image printed by a wide format printer, the number of output dot locations can be more than an order of magnitude larger. Thus the image data must be scaled for the number of output pixels, and halftoned or multitoned so that the large number of discrete dots of color on the recording medium adequately represent the intended appearance and color levels of the image.

For printing systems controlled by a host computer, some image processing tasks are performed in the printer driver of the host computer and some image processing tasks are performed in an image processing unit of the printing system. For printing applications where the amount of printing data is large, i.e. for high resolution or large size images or multiple densities of ink, image rendering and transfer of the data to the printing system is not sufficiently fast. This can result in long wait times for image spooling prior to printing, or pauses between swaths during the printing process that can cause degradation in print quality. Printing delays can also occur in printing systems operating in a standalone mode where the image processing is all done within the printing system.

As is known in the art, a more efficient way of processing image data, rather than rendering the image at fill printing resolution, is to first multitone the image at a lower resolution than the full printing resolution, but at a higher number of multitone levels than the number of levels that the printing system is capable of printing. The compressed image data is then decoded using the higher number of multitone levels to specify a dot matrix pattern or superpixel to expand the image to full printing resolution.

Although such printing resolution expansion methods are known for compressed image data, providing a reduction in image processing time, for some printing applications where the printing data is very large, even further savings of image data processing time would be advantageous in order to further reduce or eliminate delays in printing.

SUMMARY OF THE INVENTION

The present invention represents a method for processing image data received from an image data source in preparation for multipass printing, comprising a processor for performing:

a) multitoning the image data to produce a multitoned image having a multitone image resolution $R_{Mx} \times R_{My}$, and a number of multitone level values $L_M$, the multitone image resolution being lower than a printing resolution $R_{Px} \times R_{Py}$, and the number of multitone levels $L_M$ being higher than a number of printing levels $L_P$;

b) using the multitone level of a pixel in the multitoned image to select a plane of a print mask;

c) using the location of the pixel in the multitoned image to select a cell of output pixels in the selected plane of the print mask, wherein the output pixels store values representing the number of drops to be printed at corresponding locations for a particular printing pass;

d) copying the selected cell of output pixels to corresponding locations within a print buffer; and e) repeating steps b) through d) for a plurality of pixels in the multitoned image.

An advantage of the present invention is that it provides a method for efficient data processing and data transfer in printing systems using multiple printing passes by combining resolution expansion and print masking operations. This can have the effect of eliminating delays in printing.

Another advantage of the present invention is that it requires less memory to buffer image data since it is not necessary to store intermediate full-resolution image data.

The present invention has the additional advantage that it provides control over the patterns of dots printed on each printing pass, thus enabling control over artifacts such as coalescence, banding, grain and grid patterns.

BRIEF DESCRIPTION OF THE DRAWINGS

FIG. 8 shows a set of eight different-code value mask planes used in an embodiment of the present invention;

FIG. 10 shows two different mask planes from FIG. 8 and their corresponding stacked cells;

FIG. 11 shows a modified mask plane having a nonuniform data distribution in its corresponding stacked cell; and FIG. 12 shows a mask plane having several adjacent cells containing identical data patterns.

DETAILED DESCRIPTION OF THE INVENTION

Figure 1:
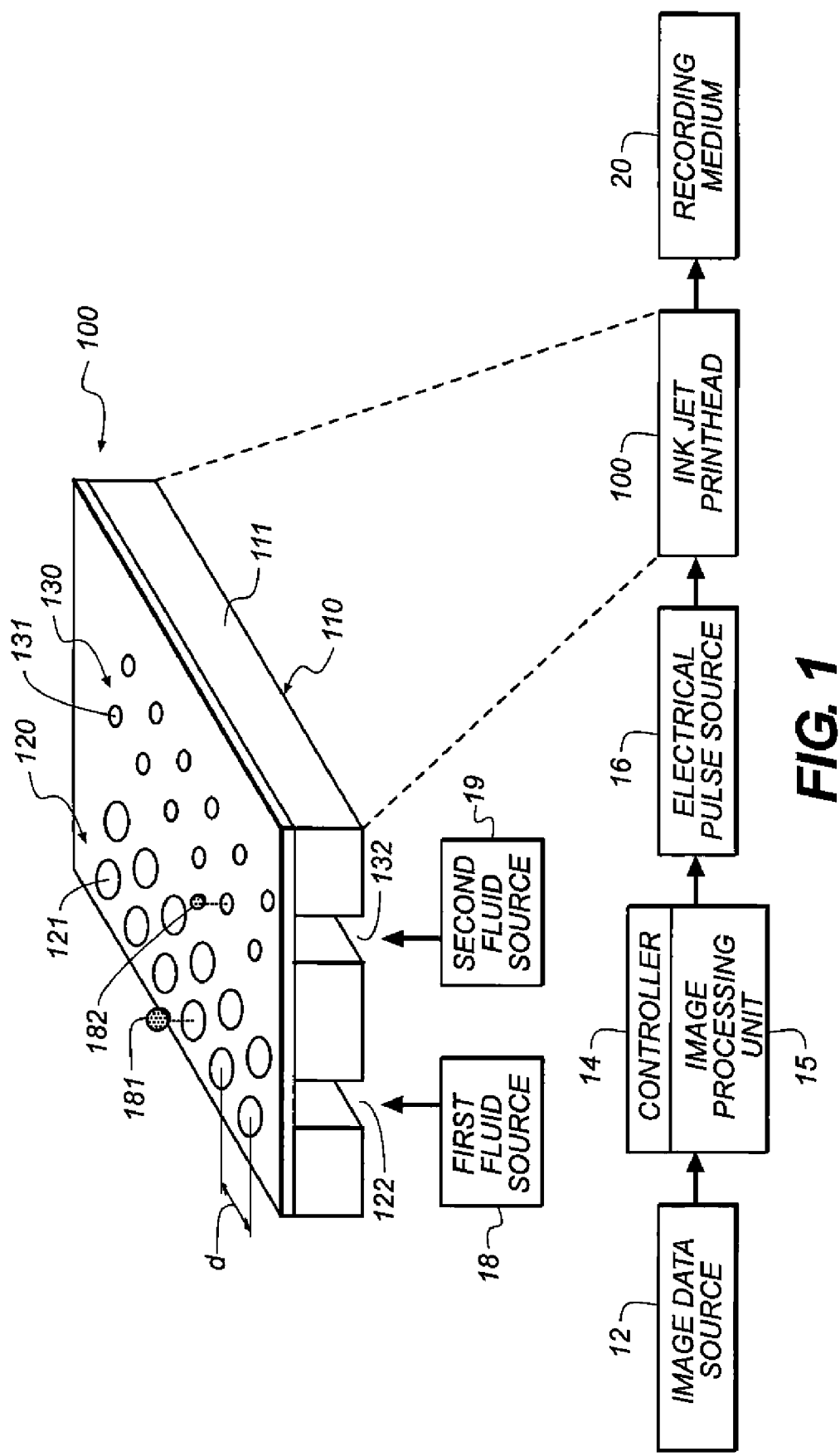
FIG. 1 is a schematic representation of an inkjet printer system that can be used in accordance with the present invention.

Referring to FIG. 1, a schematic representation of an inkjet printer system is shown, for its usefulness with the present invention and is filly described in U.S. Pat. No. 7,350,902, which is incorporated by reference herein in its entirety. The inkjet printer system includes an image data source 12, which provides data signals that are interpreted by a controller 14 as being commands to eject drops. Controller 14 includes an image processing unit 15 for rendering images for printing, and outputs signals to an electrical pulse source 16 of electrical energy pulses that are inputted to an inkjet printhead 100, which includes at least one inkjet printhead die 110. Optionally, image processing unit 15 is partially included directly the inkjet printer system, and partially included in a host computer.

In the example shown in FIG. 1, there are two nozzle arrays. Nozzles 121 in the first nozzle array 120 have a larger opening area than nozzles 131 in the second nozzle array 130. In this example, each of the two nozzle arrays has two staggered rows of nozzles, each row having a nozzle density of 600 per inch. The effective nozzle density then in each array is 1200 per inch (i.e. $d=\frac{1}{1200}$ inch in FIG. 1). If pixels on the recording medium 20 were sequentially numbered along the paper advance direction, the nozzles from one row of an array would print the odd numbered pixels, while the nozzles from the other row of the array would print the even numbered pixels.

In fluid communication with each nozzle array is a corresponding ink delivery pathway. A first ink delivery pathway 122 is in fluid communication with the first nozzle array 120, and a second ink delivery pathway 132 is in fluid communication with the second nozzle array 130. Portions of ink delivery pathways 122 and 132 are shown in FIG. 1 as openings through substrate 111. One or more inkjet printhead die 110 will be included in inkjet printhead 100, but for greater clarity only one inkjet printhead die 110 is shown in FIG. 1. The printhead die are arranged on a support member as discussed below relative to FIG. 2. In FIG. 1, first fluid source 18 supplies ink to the first nozzle array 120 via the first ink delivery pathway 122, and second fluid source 19 supplies ink to the second nozzle array 130 via the second ink delivery pathway 132. Although distinct fluid sources 18 and 19 are shown, in some applications it can be beneficial to have a single fluid source supplying ink to both the first nozzle array 120 and the second nozzle array 130 via ink delivery pathways 122 and 132, respectively. Also, in some embodiments, fewer than two or more than two nozzle arrays can be included on printhead die 110. In some embodiments, all nozzles on inkjet printhead die 110 can be the same size, rather than having multiple sized nozzles on inkjet printhead die 110.

Not shown in FIG. 1, are the drop forming mechanisms associated with the nozzles. Drop forming mechanisms can be of a variety of types, some of which include a heating element to vaporize a portion of ink and thereby cause ejection of an ink droplet, or a piezoelectric transducer to constrict the volume of a fluid chamber and thereby cause ejection of an ink droplet, or an actuator which is made to move (for example, by heating a bi-layer element) and thereby cause ejection of an ink droplet. In any case, electrical pulses from electrical pulse source 16 are sent to the various drop ejectors according to the desired deposition pattern. In the example of FIG. 1, ink droplets 181 ejected from the first nozzle array 120 are larger than ink droplets 182 ejected from the second nozzle array 130, due to the larger nozzle opening area. Typically other aspects of the drop forming mechanisms (not shown) associated respectively with nozzle arrays 120 and 130 are also sized differently in order to optimize the drop ejection process for the different sized drops. During operation, droplets of ink are deposited on the recording medium 20.

Figure 2:
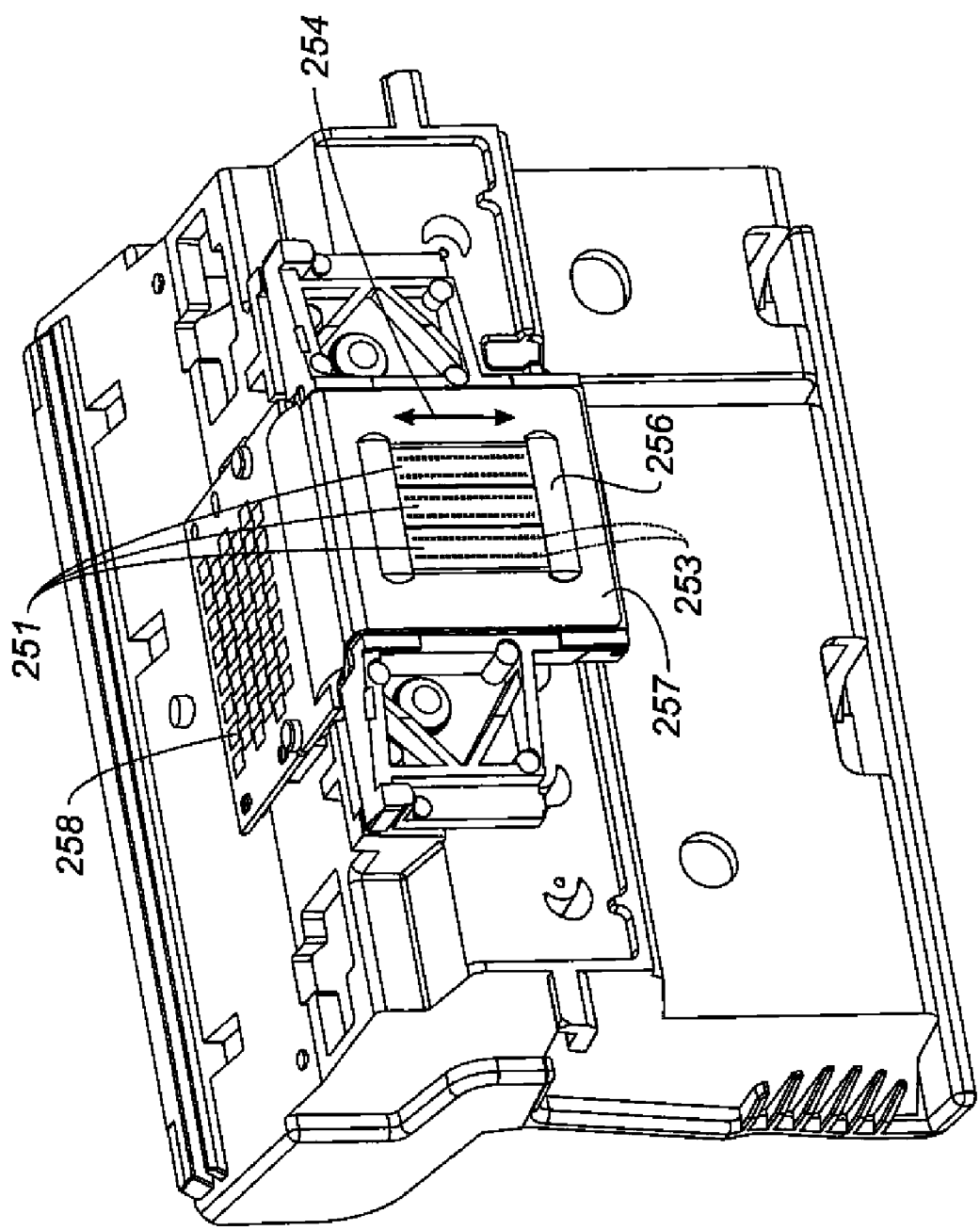
FIG. 2 is a perspective of a portion of a printhead chassis that can be used in the inkjet printer system of FIG. 1.

FIG. 2 shows a perspective of a portion of a printhead chassis 250, which is an example of an inkjet printhead 100 as shown in FIG. 1. Printhead chassis 250 includes three printhead die 251 (similar to printhead die 110 in FIG. 1), each printhead die 251 containing two nozzle arrays 253, so that printhead chassis 250 contains six nozzle arrays 253 altogether. The six nozzle arrays 253 in this example can be each connected to separate ink sources (not shown), such as cyan, magenta, yellow, text black, photo black, and a colorless protective printing fluid. Alternatively, two different nozzle arrays 253 having different nozzle sizes in each array for each printhead die 251 can be connected to the same ink source or substantially equivalent ink sources, so that for a first die 251, the large nozzles and the small nozzles each print cyan ink, for a second die 251, the large nozzles and the small nozzles each print magenta ink, and for a third die 251, the large nozzles and the small nozzles each print yellow ink. Additional printhead die 251 can be provided in the same printhead chassis 250 or in a different printhead chassis to provide large and small nozzles that print different colors or different densities of ink.

Each of the six nozzle arrays 253 is disposed along nozzle array direction 254, and the length of each nozzle array along the nozzle array direction 254 is typically on the order of 1 inch or less. Typical lengths of recording media are 6 inches for photographic prints (4 inches by 6 inches), or 11 inches for cut sheet paper (8.5 by 11 inches) in a desktop carriage printer, or several feet for roll-fed paper in a wide format printer. Thus, in order to print a full image, a number of swaths are successively printed while moving printhead chassis 250 across the recording medium 20. Following the printing of a swath, the recording medium 20 is advanced in a direction that is substantially parallel to nozzle array direction 254.

Also shown in FIG. 2 is a flex circuit 257 to which the printhead die 251 are electrically interconnected, for example, by wire bonding or TAB bonding. The interconnections are covered by an encapsulant 256 to protect them. Flex circuit 257 bends around the side of printhead chassis 250 and connects to connector board 258. When printhead chassis 250 is mounted into the carriage 200 (see FIG. 3), connector board 258 is electrically connected to a connector (not shown) on the carriage 200, so that electrical signals can be transmitted to the printhead die 251.

Figure 3:
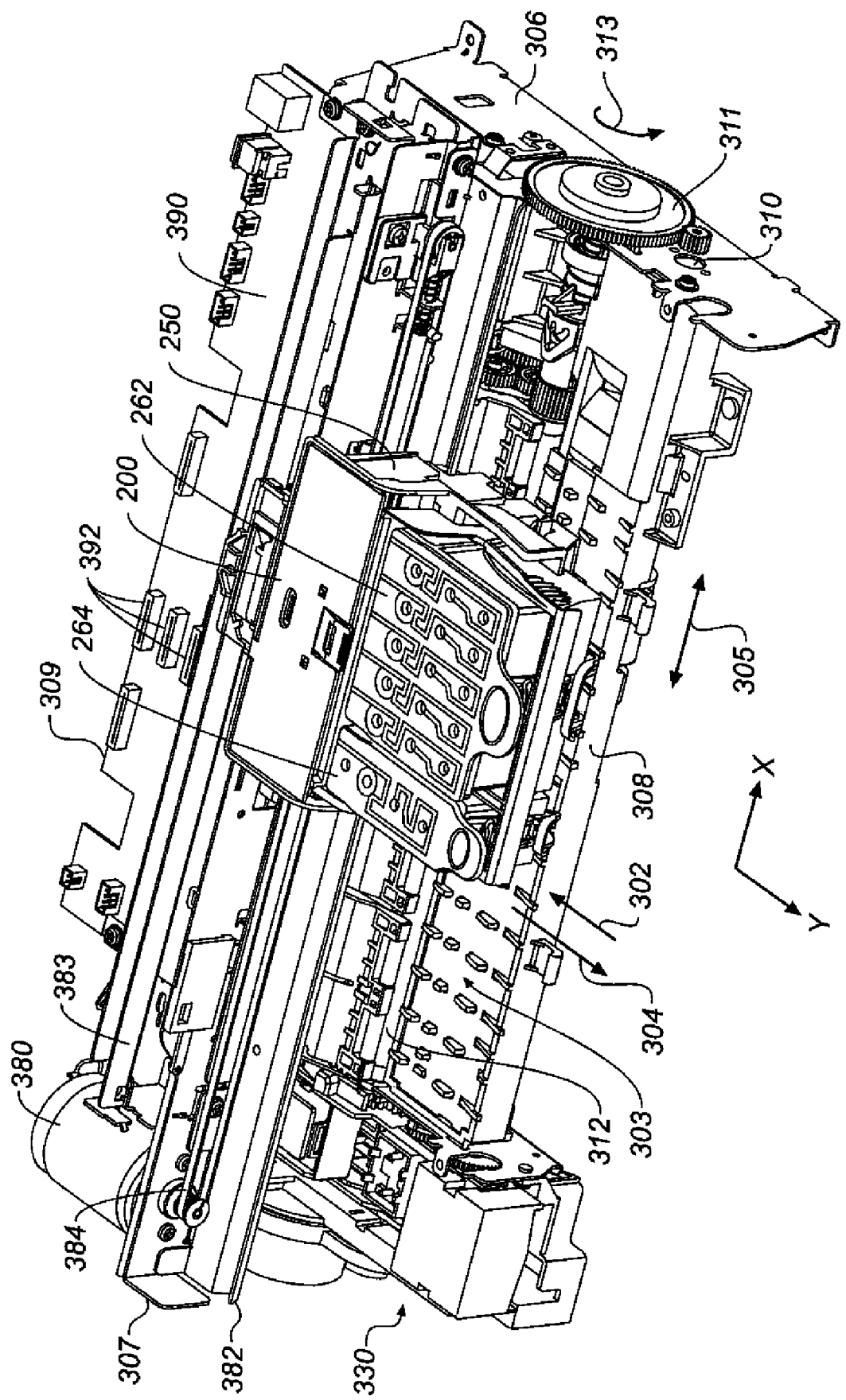
FIG. 3 is a perspective of a portion of a carriage printer.

FIG. 3 shows a perspective of a printer chassis for a desktop carriage printer. Some of the parts of the printer have been hidden in the view shown in FIG. 3 so that other parts can be more clearly seen. The printer chassis has a print region 303 across which carriage 200 is moved back and forth in carriage scan direction 305 along the X axis, between the right side of printer chassis 306 and the left side of printer chassis 307, while drops are ejected from printhead die 251 (not shown in FIG. 3) on printhead chassis 250 that is mounted on carriage 200. Carriage motor 380 moves belt 384 to move carriage 200 along carriage guide rail 382. An encoder sensor (not shown) is mounted on carriage 200 and indicates carriage location relative to an encoder fence 383.

Printhead chassis 250 is mounted in carriage 200, and ink supplies 264 are mounted in the printhead chassis 250. The mounting orientation of printhead chassis 250 is rotated relative to the view in FIG. 2, so that the printhead die 251 are located at the bottom side of printhead chassis 250, the droplets of ink being ejected downward onto the recording medium in print region 303 in the view of FIG. 3. Paper or other recording medium (sometimes generically referred to as paper or media herein) is loaded along paper load entry direction 302 toward the front of printer chassis 308.

Figure 4:
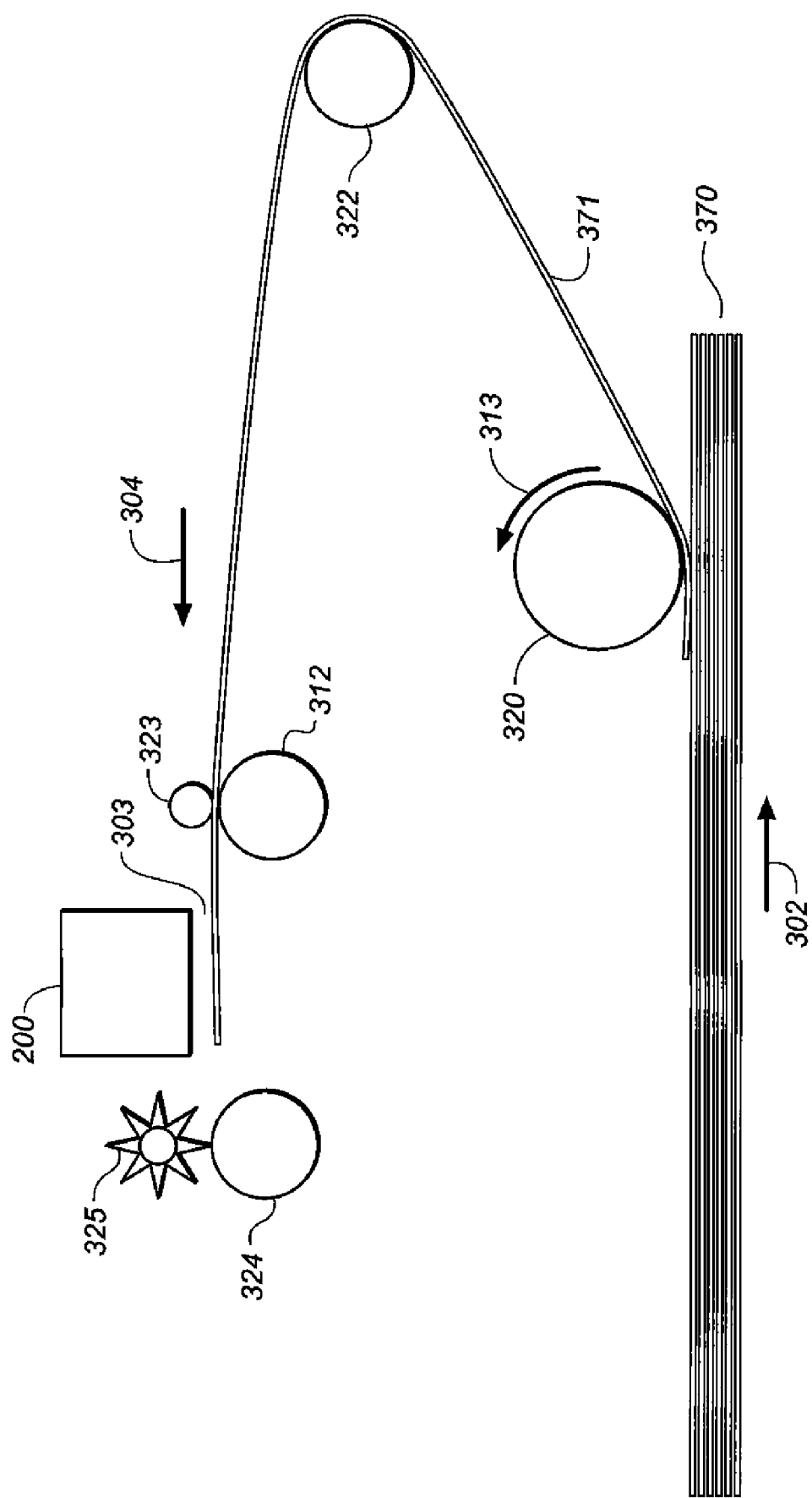
FIG. 4 is a schematic side view of an exemplary paper path in a carriage printer.

A variety of rollers are used to advance the medium through the printer as shown schematically in the side view of FIG. 4. In this example, a pick-up roller 320 moves the top piece or sheet 371 of a stack 370 of paper or other recording medium in the paper load entry direction 302. A turn roller 322 acts to move the paper around a C-shaped path (in cooperation with a curved rear wall surface) so that the paper continues to advance along media advance direction 304 from the rear of the printer chassis 309 (with reference to FIG. 3). The paper is then moved by feed roller 312 and idler roller(s) 323 to advance along the Y axis across print region 303, and from there to a discharge roller 324 and star wheel(s) 325 so that printed paper exits along media advance direction 304. Feed roller 312 includes a feed roller shaft along its axis, and feed roller gear 311 (see FIG. 3) is mounted on the feed roller shaft. Feed roller 312 can include a separate roller mounted on the feed roller shaft, or can include a thin high friction coating on the feed roller shaft. A rotary encoder (not shown)

can be coaxially mounted on the feed roller shaft in order to monitor the angular rotation of the feed roller.

The motor that powers the paper advance rollers is not shown in FIG. 3, but the hole 310 on the right side of the printer chassis 306 is where the motor gear (not shown) protrudes through in order to engage feed roller gear 311, as well as the gear for the discharge roller (not shown). For normal paper pick-up and feeding, it is desired that all rollers rotate in forward rotation direction 313. Toward the left side of the printer chassis 307, in the example of FIG. 3, is the maintenance station 330.

Toward the rear of the printer chassis 309, in this example, is located the electronics board 390, which includes cable connectors 392 for communicating via cables (not shown) to the printhead carnage 200 and from there to the printhead chassis 250. Also on the electronics board are typically mounted motor controllers for the carriage motor 380 and for the paper advance motor, a processor or other control electronics (shown schematically as controller 14 and image processing unit 15 in FIG. 1) for controlling the printing process, and a connector for a cable to a host computer.

Processing the image data from image source 12 includes converting from the 8 bit per primary color RGB data into printed dots of various hues, sizes, and optionally ink densities in a way that provides an accurate and pleasing representation of the image. For a thermal inkjet printer, this conversion should consider maximizing the available color gamut, avoiding coalescence of ink drops, minimizing image noise or graininess, avoiding overheating of printheads, minimizing the amount of data that needs to be processed and transferred, and balancing the amount of ink ejected from large nozzles and small nozzles. All of these must be considered across a wide range of recording media for various print modes and at various printing speeds.

Image processing tasks that are typically performed in the printer driver in the host computer include profiling, scaling, inverting, color mapping, screening, and compression. The RGB image can be profiled to adjust the ROB values so that the printed colors will match the color of the original image. The image is scaled to the final output size at a processing resolution that is less than the printing resolution, in order to reduce the amount of data for processing and transferring. The data is inverted to convert it into a generic CMY format. Color mapping is used to translate the generic CMY data into amounts of ink that are appropriate for the particular printing process, inks, dot sizes, recording media, and print modes in order to produce a particular color. One advantageous method of color mapping for a printing system using four or more colorants is described in US Patent Application Publication No. 2006/0250624, which is incorporated herein by reference.

In a particular example of a printing system, there are five different inks (cyan, magenta, yellow, black, and colorless protective ink) that can be used for printing a color print at a printing resolution in the x and y directions of $R_{Px}$=1200 dots per inch and $R_{Py}$=1200 dots per inch. Each pixel location can be printed either 0, 1 or 2 drops of ink (i.e. there are $L_P$=3 printing levels, which can be described with 2 bits per output pixel). If image scaling was done to provide a processing resolution (or multitoning resolution in the x and y directions) of $R_{Mx}$=600 dots per inch and $R_{My}$=600 dots per inch, then after the color mapping step, the image data would have five color planes of 600 dpi by 600 dpi 8-bit data. The five color planes are then each multitoned down to a smaller number of bits per pixel (for example 4 bits per pixel), using a method such as error diffusion to determine the 4-bit values with minimal loss of image information. The largest number of multitone levels that can be described by the 4 bits per pixel is 16 (although a number $L_M$ of multitone levels that is less than 16 can also be described with 4 bits), which is larger than the number of printing levels $L_P$=3 that are required to specify at each dot location how many dots should be printed. The number $L_M$ of multitone levels is subsequently used as described below to expand the multitoned image from the lower multitone resolution to the higher printing resolution, and also to specify how many dots should be used.

The steps described above that are typically performed by the printer driver in the host computer can also be described as follows: Image data is multitoned to produce a multitoned image having a multitone image resolution of $R_{Mx} \times R_{My}$, and a number of multitone level values $L_M$, such that the multitone image resolution is lower than the printing resolution $R_{Px} \times R_{Py}$ and the number of multitone levels is higher than the number of printing levels $L_P$. Note: for standalone printing systems where a host computer is not responsible for a portion of the image processing, these steps can be done in the printing system itself.

Because the image data was scaled to a lower multitone image resolution $R_{Mx} \times R_{My}$ (600 dpi×600 dpi) than printing resolution $R_{Px} \times R_{Py}$ (1200 dpi×1200 dpi), the color mapping and screening algorithms only need to work on 600 dpi×600 dpi data rather than on 1200 dpi×1200 dpi data. In addition, the amount of data that needs to be transferred from the host computer to the printing system is similarly reduced. This results in a very significant reduction in image processing time.

After the multitoned image data is transferred to the printing system, the 600 dpi×600 dpi, 4-bit data needs to be expanded into 1200 dpi×1200 dpi, 2-bit data for printing. The 4-bit data of the multitoned image describes, in up to 16 levels, how much ink should be put down on the recording medium at a given 600 dpi×600 dpi location, i.e. in a 2×2 group of dot locations at 1200 dpi×1200 dpi. For prior art expansion methods, in order to expand the 600 dpi×600 dpi multitoned image data into 1200 dpi×1200 dpi printing data, each multitone level value corresponds to a 2×2 look-up table entry that specifies a number and pattern of dots to be printed in that 2×2 location. The look-up tables are stored in printing system memory.

Figure 5:
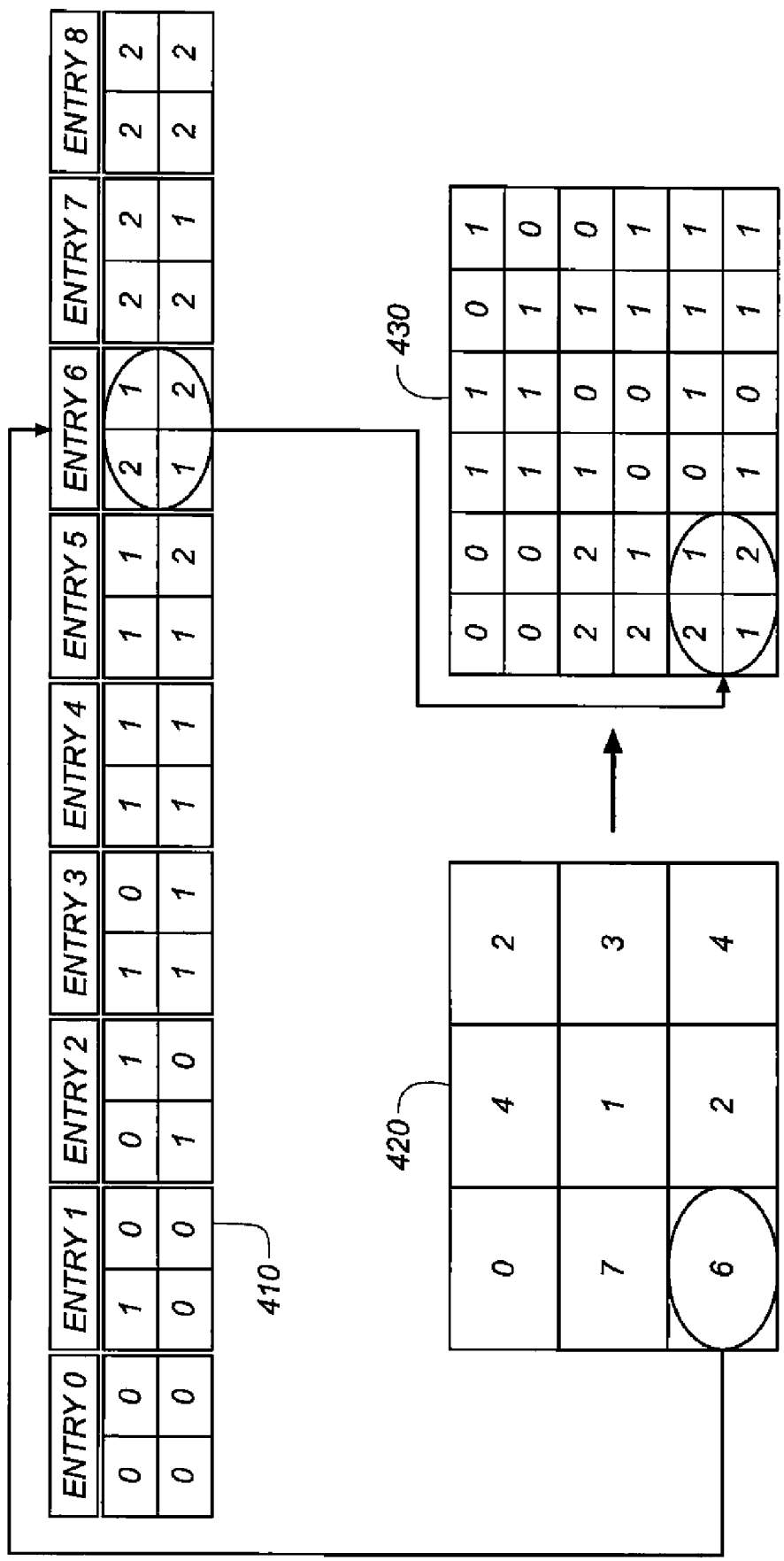
FIG. 5 shows an example of using a look-up table for expanding image data multitoned to a resolution less than printing resolution, according to a prior art method.

FIG. 5 shows a specific implementation of a prior art expansion method to expand from 4-bit multitoned 600 dpi×600 dpi image data to 2-bit printing data at 1200 dpi×1200 dpi. Look-up table 410 has nine 2×2 entries, Entry 0 through Entry 8. Entry 0 specifies 0 dots for each of the four positions, Entry 8 specifies 2 dots for each of the four positions (that is, a total of 8 dots), and likewise the intermediate entries have a total number of dots in the four positions that is equal to the entry number. Each entry specifies via a 2×2 matrix how multitoned 600 dpi by 600 dpi image data is to be expanded into 1200 dpi×1200 dpi printing data. Since 9 different entries are available in the four positions with 0, 1 or 2 dots per position, 4 bits are required in the multitoned image data for expansion from 600 dpi×600 dpi to 1200 dpi×1200 dpi. A 3×3 portion of 600 dpi×600 dpi multitoned image data 420 includes values that can range from 0 to 8, although in this exemplary portion of multitoned image data 420 of the highest data value is 7. Expansion of this portion of multitoned image data 420 by prior art methods can be accomplished as indicated by the connected ovals. A value in a particular position of the multitoned image data (for example, the value 6 in the lower left corner of the multitoned image data 420) corresponds to Entry 6 of the look-up table 410, and the contents of the matrix corresponding to this entry are used to expand the lower left corner to provide printing image data

430 at full resolution. Following the expansion to full resolution, the image data can be printed in multiple passes, for example, using a set of masks that are stored in printer memory.

In this example the printing resolution in the x direction $R_{Px}$ (1200 dpi) is 2× the multitone image resolution in the x direction $R_{Mx}$ (600 dpi), and similarly for the y direction $R_{Py}=2\times R_{My}$. More generally, the printing resolution in the x and y directions is an integer multiple of the multitone image resolution, i.e. $R_{Px}=n\times R_{Mx}$ and $R_{Py}=m\times R_{My}$. In general, each value of the multitone levels corresponds to an n×m matrix of entries in order to expand the multitoned image data from the multitone resolution to a print-ready image having a printing resolution for small dots and large dots Although the matrices of the look-up table 410 specify dot positions at each level, it is generally not desirable to maintain that same dot position for all n×m pixel groupings at that level for that color within the image. In particular, for regions of an image having a uniform color, maintaining the same dot position across a number of adjacent n×m pixel groupings would cause undesirable image artifacts such as grids or lines that would be noticeable to the eye. Therefore an additional step is taken, as described in the prior art, to randomize the dot positions of the n×m pixel groupings for a particular color level. In addition to using the n×m matrix specifying the dot relationships to expand to full printing resolution, an alteration operation is performed on the dot positions specified by the n×m matrix such that the positions are selectably modified (e.g., rotated, flipped horizontally, flipped vertically, flipped both horizontally and vertically or left intact). The particular alteration operation can, for example, be selected by a pseudo-random number generator, or a set of pixel-location-dependent alteration rules.

Although such prior art methods for expanding the multitoned image data into printing data at fill resolution can be adequate in many applications, some high-speed, high-resolution printing applications require still further improvements in the efficiency of processing image data. An important feature of the present invention is to integrate the steps of expansion of the multitoned image data and print masking, in order to increase the speed of image processing for multipass printing applications.

Figure 6:
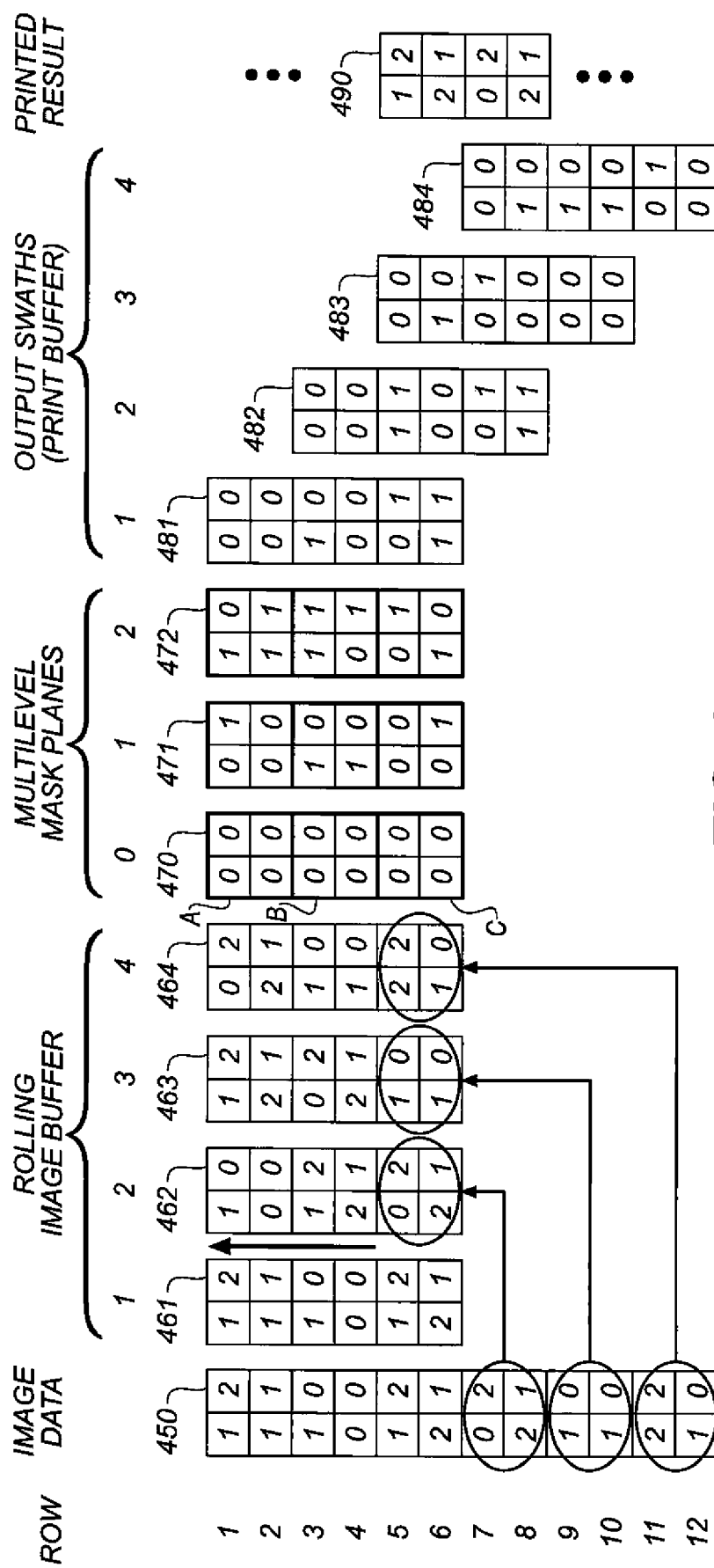
FIG. 6 shows an example of how the printing of image data is accomplished with a prior art multilevel print masking method.

To further understand the present invention, a multilevel print masking method for multipass printing as disclosed in U.S. Patent Application Publication No. 2008/0309952 (incorporated herein in its entirety) will first be described. In this method, a set of multilevel mask planes is provided, where the number of planes in the set is equal to the number of printing levels, i.e., to the number of choices for how many dots can be printed at each output pixel location. FIG. 6 shows an example of how printing is accomplished with this multilevel print masking method for a printing system that can selectably print 0, 1 or 2 dots at each output pixel location, corresponding to the case of 3-pass printing. For this illustration, a nozzle array (not shown) having N=6 nozzles will be assumed. However, it will be obvious to one skilled in the art that it can be applied to any size nozzle array. A portion of image data 450 at full printing resolution is shown, where the portion of image data 450 has 12 rows and 2 columns and contains code values indicating how many dots (0, 1 or 2) should be printed at each output pixel location. A rolling image buffer is provided in printer memory and is capable of holding N=6 rows and 2 columns of image data. The contents of the rolling image buffer are shown at four different times (461, 462, 463 and 464) corresponding to four output printing swaths 481, 482, 483 and 484. Also provided in printer memory is a set of multilevel mask planes 470, 471 and 472 corresponding to code values 0, 1 and 2, respectively. The mask height (i.e. the number of mask rows) is N=6 and the mask width (i.e. the number of columns) is 2; the masks of the mask set have the same number of rows and columns as the rolling image buffer. Each multilevel print mask includes three complementary mask sections A, B and C, since they are designed for 3-pass printing. The height of each complementary mask section is N/P=2 where N is the number of nozzles in the array used for printing and P is the number of passes of printing. In this simple example, each of the complementary mask sections contains four mask elements (positioned at upper left, upper right, lower left and lower right in the mask section). Complementary mask elements are those having the same relative position in each mask section. A characteristic of the multilevel print masks is that their code value equals the sum of the values of complementary mask elements. In other words, for multilevel mask plane 471 having a code value of 1, the sum of the values of upper right mask elements in complementary mask sections A, B and C is 1+0+0=1, and similarly for the other positions. Similarly, for multilevel mask plane 472 having a code value of 2, the sum of the values of lower left mask elements in complementary mask sections A, B and C is 1+0+1=2, and similarly for the other positions. For multilevel mask plane 470, having a code value of 0, all mask elements are 0.

Printing in this 3-pass implementation of the multilevel print masking method of US Patent Application Publication 2008/0309952 can be accomplished as follows. Six rows of data at a time are stored in the rolling image buffer. At time 1 (in preparation for printing a first output swath 481), the contents of rolling image buffer 461 are the same as rows 1 through 6 of image data 450. The code value in each position of the rolling image buffer 461 is used to select an element in the corresponding position of the multilevel mask plane (470, 471 or 472) corresponding to code value (0, 1 or 2) in the rolling image buffer 461. That element specifies whether or not a dot will be printed in the corresponding position of the output swath 481. For example, at time 1, the upper left value in rolling image buffer 461 is 1. The upper left element in multilevel mask plane 471 (corresponding to a code value of 1) is 0. This means that for output swath 481, the printing data in the print buffer (provided in printer memory) is 0 for the upper left position and therefore no dot should be printed at that location at that time. Similarly, at time 1 the lower left value in rolling image buffer 461 is 2. The lower left element in multilevel mask plane 472 (corresponding to a code value of 2) is 1. This means for output swath 481, the printing data in the print buffer is 1 for the lower left position, and therefore a dot should be printed at that location at that time. In similar fashion, all of the printing data is determined for the print buffer for output swath 481. The six nozzles are used to print the first column of data in the print buffer for output swath 481 at a first timing or timings specified by the encoder sensor and encoder fence 383 (relative to FIG. 3). The six nozzles are used to print the second column of data in the print buffer for output swath 481 at a second timing or timings specified by the encoder sensor and encoder fence 383 either just prior to or just subsequent to the first timing or timings, depending on the carriage motion direction of output swath 481. After output swath 481 is completed for all positions corresponding to rows 1-6 of the image, the recording medium is advanced by a distance of N/P=2 rows in an upward direction relative to the orientation of FIG. 6. Thus, the output swath 482 is shown as being displaced downward by two rows relative to output swath 481. (Output swaths 481 and 482 are shown as offset horizontally, but this is just for clarity of showing the data for both output swaths without their being partially superimposed in the figure.) For output swath 482, the data in rolling image buffer 462 at time 2 is used (similar to the way the data in rolling image buffer at time was used for output swath 481, as described above). The data in rolling image buffer 462 at time 2 is formed by rolling the data in rolling image buffer 461 upward by N/P=2 rows, with the upper two rows moving out of the rolling image buffer 462, and rows 7 and 8 of the image data moving into the bottom two rows of rolling image buffer 462, as indicated by the ovals and arrow. The same printing process is repeated for output swaths 482, 483 and 484 as described above. The printed result 490 is shown at the far right in FIG. 6. The printed result is the sum of the output data for the three complementary printing passes. In FIG. 6, only image data in rows 5, 6, 7, and 8 are shown for a complete set of three passes, but it can be seen that the printed result 490 is the same as the image data in those four rows. Image data for rows 1-4 and 9-12 is incompletely printed in FIG. 6 (with the printing being completed with printing passes prior to output swath 481 for rows 1-4, and by printing passes subsequent to output swath 484 for rows 9-12). Incompletely printed image data is shown as a black dot in FIG. 6, but the image data 450 would be completely printed with the additional complementary swaths so that the completely printed image for three complementary passes is the same as the image data 450, as demonstrated by the printed result 490 for rows 5-8.

Figure 7:
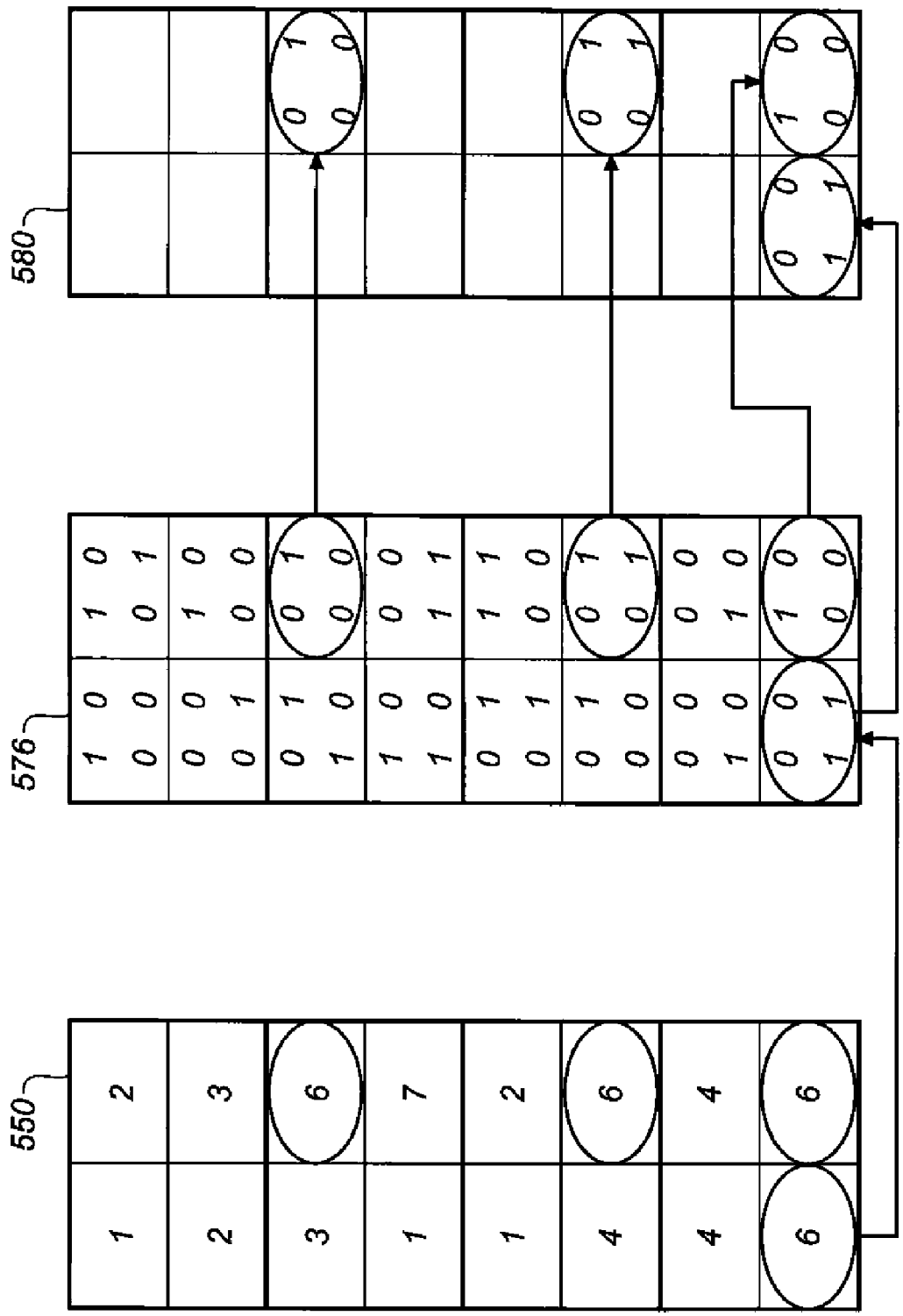
FIG. 7 shows an embodiment of the present invention in which the values of multitoned image data pixels are used to select a plane of a multilevel print mask set for expanding the multitoned image data to the printing resolution.
Figure 8:
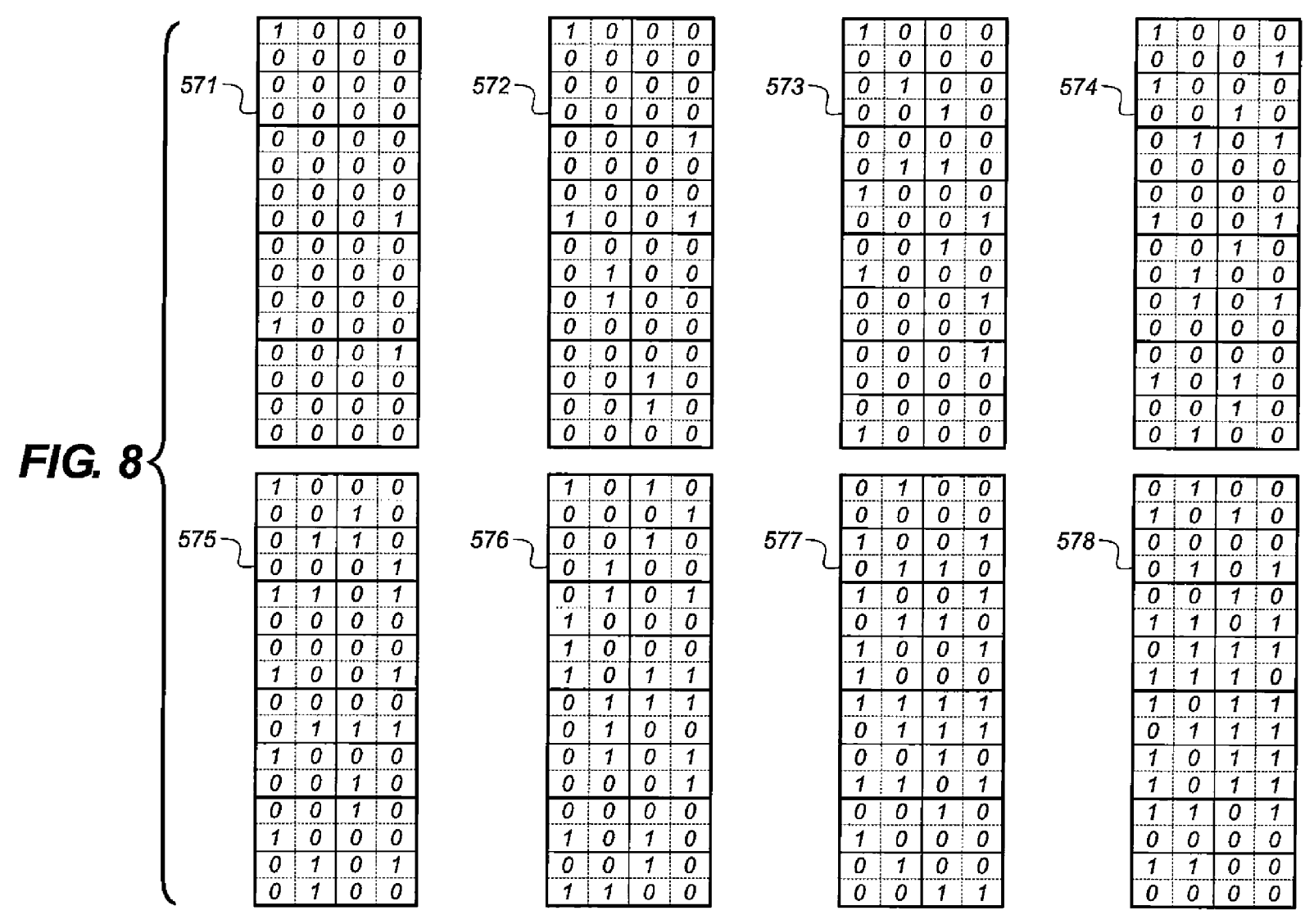
Figure 9:
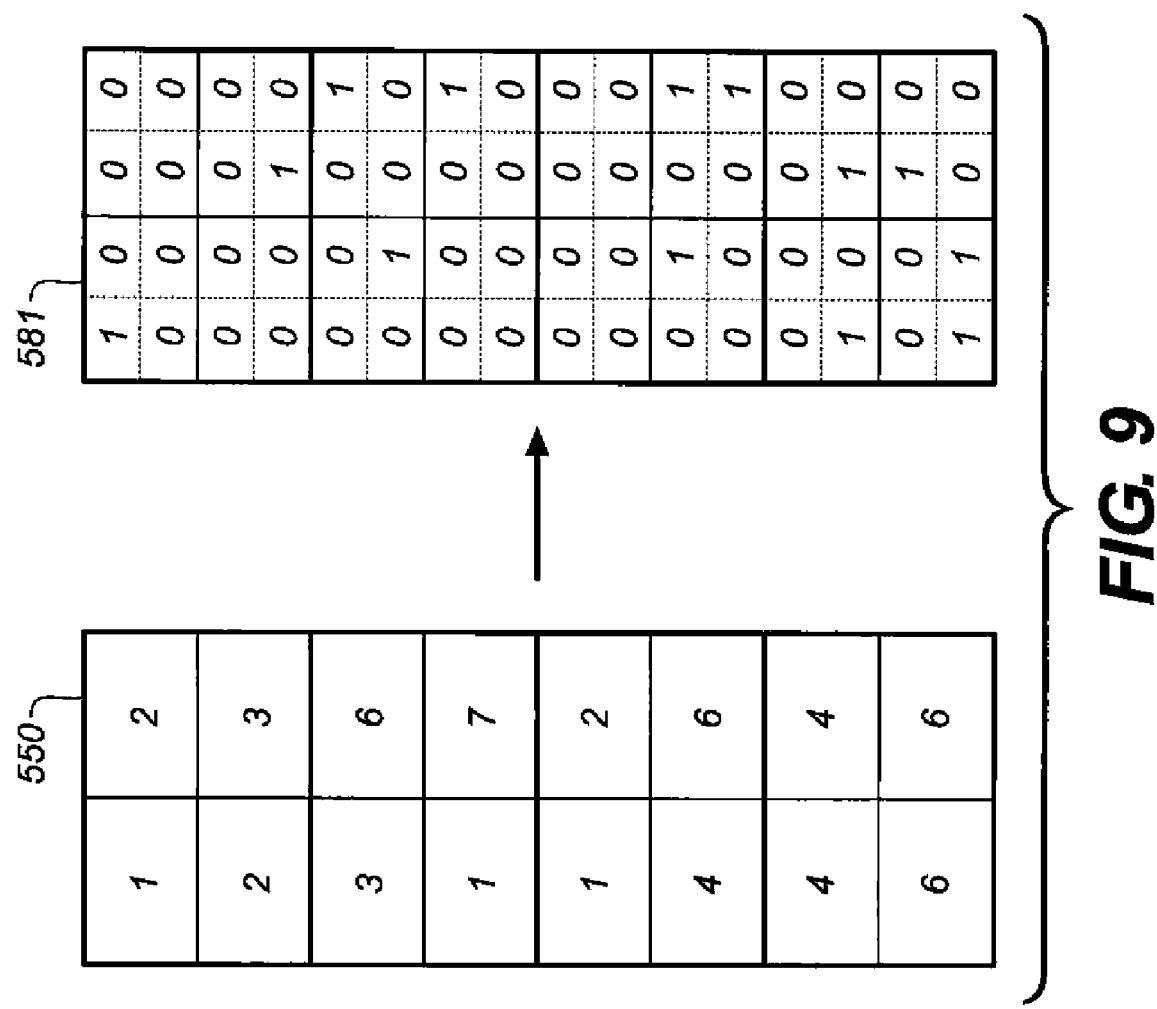
FIG. 9 shows the complete expansion of a portion of multitoned image into data in a print buffer using the multilevel mask planes of FIG. 8, according to an embodiment of the present invention.

An embodiment of the present invention is described with reference to FIGS. 7 and 8 for 4-pass printing with a nozzle array including N=16 printing nozzles at a printing resolution of $R_{Px}$=1200 dpi by $R_{Py}$=1200 dpi with $L_P$=3 printing levels (e.g. 0, 1 or 2 dots printed at each pixel location). With reference to FIG. 7, a portion of multitoned image data 550 that has been received from an image data source has been multitoned to $L_M$=9 multitone levels at a multitone image resolution of $R_{Mx}$=600 dpi by $R_{My}$=600 dpi. The multitone image resolution $R_{Mx} \times R_{My}$ is lower than the printing resolution $R_{Px} \times R_{Py}$ and the number of multitone levels is higher than the number of printing levels $L_P$. It is advantageous if the product $R_{Mx} \times R_{My}$ is less than the product $R_{Px} \times R_{Py}$, but it is not required that both $R_{Mx} < R_{Px}$ and $R_{My} < R_{Py}$. Up to this point, the process is the similar to that described above. Inventive aspects of the present invention relate to the expansion of the multitoned image data into full resolution printing data. In the example shown in FIG. 7, the multitone level of a pixel in the multitoned image data 550 is used to select a corresponding plane of a full-printing-resolution multilevel print mask. Examples of mask planes 571 through 578, respectively having code values 1 through 8 (corresponding respectively to multitone levels 1 through 8) are shown in FIG. 8. The mask plane having a code value of 0 has all elements equal to 0, and is not shown in FIG. 8. The location of the pixel of the multitoned image data 550 is used to select a cell of output pixels in the selected plane of the print mask, where a value of the output pixels corresponds to a number of drops to be printed in an output swath. The selected cell of output pixels is copied to corresponding locations within print buffer 580 for an output swath. The steps of plane selection, cell selection, and cell copying to the print buffer 580 are repeated for each pixel in the multitoned image. To illustrate this process, mask plane 576 corresponding to a code value of 6 is shown in FIG. 7. The pixels of multitoned image data 550 that have a multitone level of 6 are indicated by ovals in FIG. 7. The corresponding 2×2 cells in mask plane 576 are also indicated by ovals. The data from each of the selected 2×2 cells in mask plane 576 is copied to corresponding locations in the print buffer 580 for an output swath. The remaining locations in the print buffer 580 are filled by copying values from the mask planes corresponding to the code values of the multitoned image data 550. (This process is not shown in FIG. 7.) For example, for the upper left pixel location in multitoned image data 550 having a level of 1, the upper left 2 by 2 cell of mask plane 571 (corresponding to a code value of 1) would be used to provide the data for the upper left 2 by 2 cell of print buffer 580. The complete print buffer 581 formed using the multitoned image data 550 and the mask planes 571 through 578 of FIG. 8 is shown in FIG. 9. Of course, the data in the complete print buffer 582 is only for one of the four complementary output swaths in this 4-pass print mode example. The printed result (not shown) would be the composite of the four complementary output swaths.

In embodiments such as the one described above where the printing resolution $R_{Px}$=1200 dpi by $R_{Py}$=1200 dpi and the multitoned image resolution is $R_{Mx}$=600 dpi by $R_{My}$=600 dpi, each cell of output pixels specified by the planes of the multilevel print mask set has a cell size of 2×2. More generally, the size of each cell is n×m, where n=$R_{Px}/R_{Mx}$, and m=$R_{Py}/R_{My}$. It is advantageous if n×m>1, even if n=1 or m=1.

Mask planes 571 through 578 shown in FIG. 8 are merely examples of the many different mask patterns that can be used in accordance with the present invention, corresponding to multitone levels of 1-8 respectively. In order to provide the correct multitone output in the printed result formed by P complementary passes, in a preferred embodiment the sum of the data in each "stacked cell" of a mask plane having a code value V is V. A "stacked cell" is defined herein as the sum of P complementary cells in the mask plane. In the present example of 4-pass printing, P=4. FIG. 10 illustrates stacked cells for mask planes 576 and 578 of FIG. 8, respectively. Stacked cell matrix 646 includes the four stacked cells for mask plane 576 corresponding to a code value V=6. The number of stacked cells in the stacked cell matrix is the number rows of cells times the number of columns of cells in the mask plane divided by P (e.g., 8×2/4=4 in this example). As indicated by the ovals in FIG. 10, the upper right stacked cell 625 in stacked cell matrix 646 is the sum of the upper right complementary cells 621, 622, 623 and 624 in mask plane 576. The other stacked cells in stacked cell matrix 646 are similarly sums of correspondingly located complementary cells in mask plane 576. Note that for each of the stacked cells in stacked cell matrix 646, the sum of the data in the stacked cell equals the code value V=6. Similarly, the lower right stacked cell 635 in stacked cell matrix 648 is the sum of the lower right complementary cells 631, 632, 633 and 634 in mask plane 578, corresponding to a code value V=8. Notice that the sum of the data in each of the stacked cells in stacked cell matrix 648 is 8, which is equal to the code value of mask plane 578. Each of the mask planes 571 through 578 was constructed to have the sum of the data in each of the corresponding stacked cells equal to the code value of the mask plane.

A second feature of the stacked cells of mask planes 571 through 578 that is that the data in the stacked cell is nearly uniformly distributed. This can be seen by examining the stacked cell matrices 646 and 648 in FIG. 10, where the maximum number in each stacked cell (i.e. 2 in the case of stacked cell matrices 646 and 648) differs from the minimum number in each stacked cell (1 for stacked cell matrix 646 and 2 for stacked cell matrix 648) by less than 2.

Figures 10A, 10B, 11:
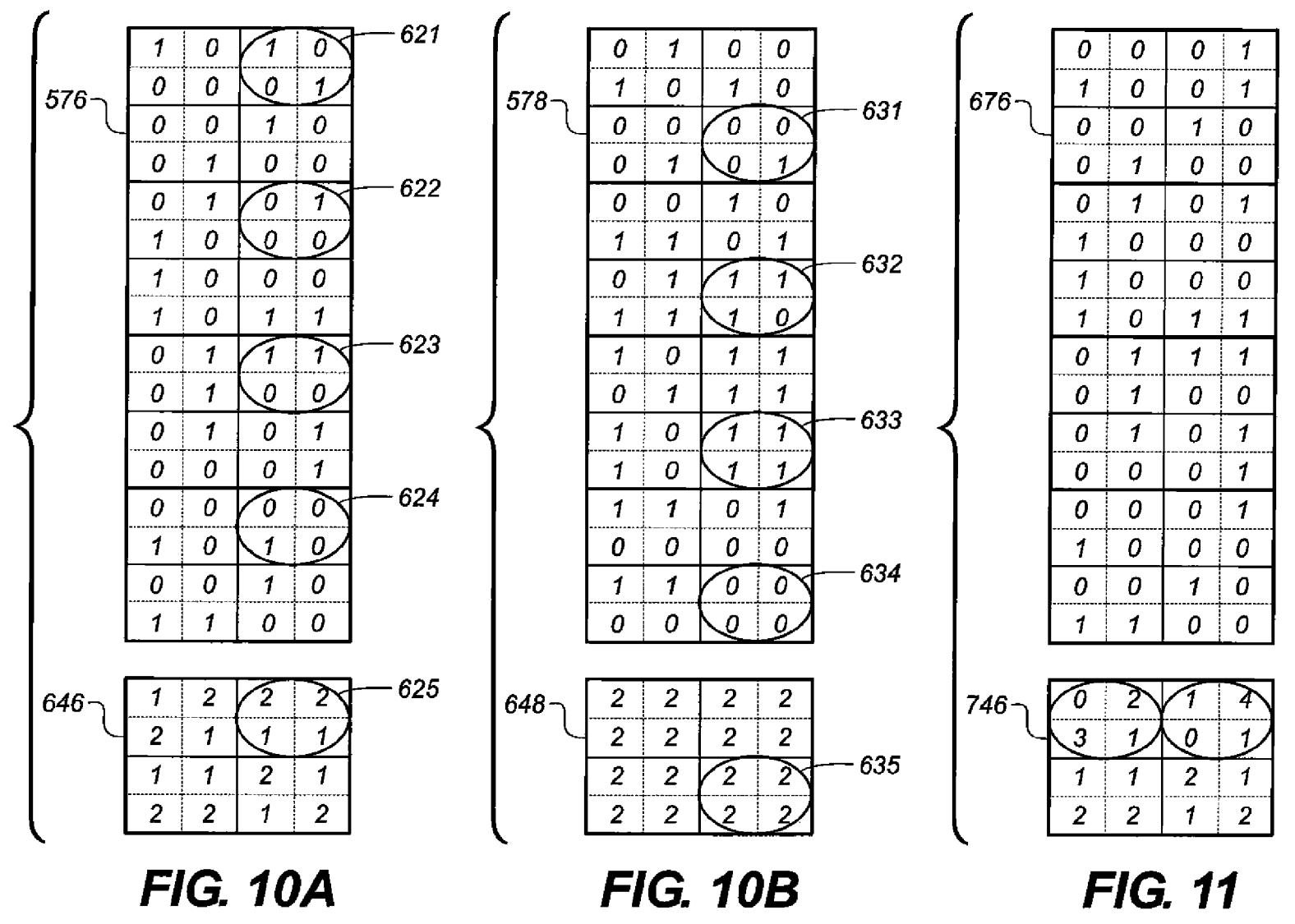

To illustrate how the design of the mask planes can influence the uniformity of the data in the stacked cells, FIG. 11 shows a modified mask plane 676 for V=6, that has most cells identical to mask plane 576. It can be seen that all stacked cells in modified stacked cell matrix 746 corresponding to the modified mask plane 676 have data that sums to V=6, as specified in the previous paragraph. However, note that the upper two stacked cells in modified stacked cell matrix 746 (indicated by ovals) do not have the data nearly uniformly distributed. In the upper left stacked cell, the maximum number minus the minimum number is 3, and in the upper right stacked cell, the maximum number minus the minimum number is 4. The stacked cell, being the sum of the complementary cells in the mask plane, is representative of the printed result. If the image data were uniform for a particular color over an extended region (e.g. the cyan content of a uniformly blue sky in a photo image), stacked cells such as the upper stacked cells in modified stacked cell matrix 746 can result in a noisy, grainy image, and possibly coalescence. The more nearly uniform data distribution in stacked cell matrix 546 of FIG. 10 is more likely to provide printed images with a less grainy appearance.

For mask planes having a code value V that is evenly divisible by the number of cells n×m, the above criterion of having the data in the stacked cell nearly uniformly distributed, will result in all elements of the stacked cell matrix equal to V/(n×m). For example, in FIG. 10, mask plane 578 has a code value of 8 and n=m=2, so each element in the stacked cell matrix 548 equals 2. Similarly, although the stacked cell is not shown for mask plane 574 in FIG. 8 (having a code value of V=4), it can be readily shown that all elements in the corresponding stacked cell matrix are equal to 1. This is analogous to saying that each output pixel in the stacked cell receives the same number of drops as each other output pixel in the stacked cell. However, if the code value of the mask plane is not divisible by n×m (as is the case for V=1, 2, 3, 5, 6, and 7 and n=m=2) corresponding to mask planes 571, 572, 573, 575, 576, and 577 in FIG. 8, at least one element in the stacked cell will be different from at least one other element in the stacked cell. This is illustrated by stacked cell matrix 546 in FIG. 10 corresponding to mask plane 576. Some elements of the stacked cell have a value of 2 and others have a value of 1. In other words, at least one output pixel in the stacked cell will receive a different number of drops than at least one other output pixel in the stacked cell.

In order to use the method described above for expanding image data to printing resolution from multitoned image data for a full color image, there will need to be a set of multilevel mask planes such as 571 through 578 (plus the plane having a code value of 0) for each color plane of the image. It is generally desirable that for a given multitone level (i.e. a given mask code value) for two different color planes that a different output pixel pattern be printed. In other words, it is desirable that the distribution of data in a stacked cell for a given mask code value for one color plane be different than the distribution of data in the corresponding stacked cell for the same mask code value for a second color plane. For example in FIG. 10, the upper right stacked cell in stacked cell matrix 546 corresponding to mask plane 576 is composed of an n×m=2×2 cell having upper right and upper left elements equal to 2 and lower left and lower right elements equal to 1. If this is the configuration of the upper right stacked cell matrix for a particular color plane such as cyan, then there should be a different configuration of 1's and 2's for the upper right stacked cell matrix for the magenta color plane Another consideration in the design of multilevel mask planes in this method of expanding multitoned image data to printing resolution is that in order to keep repetitive dot patterns from being visibly noticeable and objectionable in the image, it is preferable to constrain adjacent cells in a plane of the print mask to have different patterns of output pixels. Adjacent cells are cells that are next to each other. This is analogous to saying that adjacent stacked cells in the stacked cell matrix should have different configurations of data from one another where possible. Note that in FIG. 10, stacked cell 546 satisfies this criterion in that no adjacent stacked cell has the same arrangement of 1's and 2's. In fact, it can also be preferable in some embodiments that there be no obvious patterns within a stacked cell matrix, such as not all 1×s in a row or a column or on a diagonal of the stacked cell matrix. Stacked cell 546 also satisfies this criterion. In FIG. 10, all stacked cells in stacked cell matrix 548 are identical because the criterion for uniform distribution of data in a stacked cell leads to only one choice if the mask code value V is evenly divisible by n×m.

Figure 12:
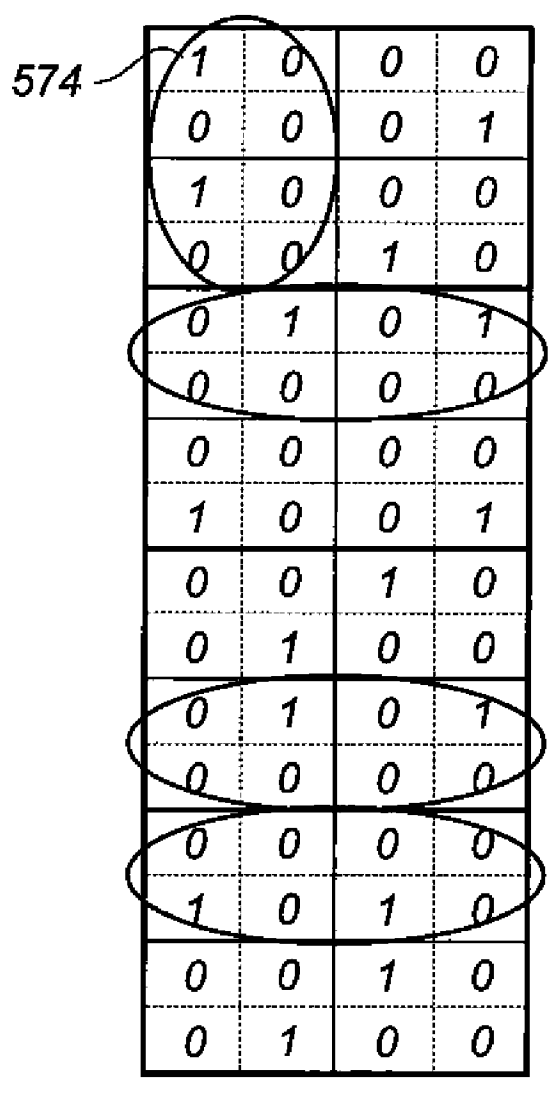

Furthermore, it can also be desirable to constrain adjacent cells within the mask plane not to be identical. FIG. 12 illustrates that mask plane 575 of FIG. 8 fulfills this criterion better than mask plane 574 does. The ovals on mask plane 574 in FIG. 12 indicate four pairs of adjacent cells that are identical. By contrast, there are no identical pairs of horizontally, vertically or diagonally adjacent cells in mask plane 575 in FIG. 8. In some embodiments it can be acceptable to have a relatively small number of adjacent cells that are identical, for example, fewer than 10% of the cells of a mask plane are members of adjacent identical pairs, where both cells of an adjacent identical pair of cells have the same data pattern.

For mask planes having few columns, such as the 4 columns of the mask planes in FIG. 8, it can be difficult to configure masks for all colors having the desirable mask configuration features described above. Therefore, in some embodiments mask planes are designed to have more than one hundred columns in order to provide more variability within the mask plane. The height of the print mask plane for a given print mode is typically chosen to be the same as the number of nozzles of the array that are used for that print mode, which can be several hundred or more.

In the examples above, the number of drops printed corresponding to a stacked cell (i.e. the sum of the elements of a stacked cell) is assumed to be the same as the multitone level V. However, in some embodiments, the number of drops printed corresponding to a stacked cell is not equal to the multitone level V. For example, in a print mode of a printing system having three output levels, the output level choices can be 0 drops, 1 drop or 3 drops at a given pixel location. The mask planes of the multilevel mask plane set would then be designed such that the elements of stacked cells contained the numbers 0, 1 or 3, and the multitone level can be less than the sum of the numbers in the stacked cell. In particular, the sum of the numbers in the stacked cell would be greater than the multitone level for multitone levels where a stacked cell contained a number 3. For a multilevel mask set having 9 mask planes (analogous to the 8 mask planes of FIG. 8 plus the plane with code level of 0), this would most likely occur for the mask planes having code values greater than 4.

Multitoning to a higher level of levels $L_M$ than the number of printing levels $L_P$ and at a multitone image resolution that is a factor of n×m lower than the printing resolution can be done in many different ways. The multitone image resolution is chosen (i.e. n and m are chosen) in different embodiments to trade off speed and memory savings with the final image quality. A guideline for the number of multitone level $L_M$ is $L_M=(L_P-1)\times(n\times m)+1$. For example, if n=3, m=2 and $L_P=3$, then $L_M=13$. If the final printing resolution is 1200 dpi by 1200 dpi, the image data would be scaled to 400 dpi by 600 dpi and multitoned to 13 levels.

The invention has been described in detail with particular reference to certain preferred embodiments thereof, but it will be understood that variations and modifications can be effected within the spirit and scope of the invention.

PARTS LIST

| | |
|---|---|
| 12 | Image data source |
| 14 | Controller |
| 15 | Image processing unit |
| 16 | Electrical pulse source |
| 18 | First fluid source |
| 19 | Second fluid source |
| 20 | Recording medium |
| 100 | Inkjet printhead |
| 110 | Inkjet printhead die |
| 111 | Substrate |
| 120 | First nozzle array |
| 121 | Nozzle(s) |
| 122 | First ink delivery pathway |
| 130 | Second nozzle array |
| 131 | Nozzle(s) |
| 132 | Second ink delivery pathway |
| 181 | Ink droplet(s) |
| 182 | Ink droplet(s) |
| 200 | Carriage |
| 250 | Printhead chassis |
| 251 | Printhead die |
| 253 | Nozzle arrays |
| 254 | Nozzle array direction |
| 256 | Encapsulant |
| 257 | Flex circuit |
| 258 | Connector board |
| 264 | Ink supply |
| 302 | Paper load entry direction |
| 303 | Print region |
| 304 | Media advance direction |
| 305 | Carriage scan direction |
| 306 | Right side of printer chassis |
| 307 | Left side of printer chassis |
| 308 | Front of printer chassis |
| 309 | Rear of printer chassis |
| 310 | Hole (for paper advance motor drive gear) |
| 311 | Feed roller gear |
| 312 | Feed roller |
| 313 | Forward rotation direction |
| 320 | Pick-up roller |
| 322 | Turn roller |
| 323 | Idler roller |
| 324 | Discharge roller |
| 325 | Star wheel(s) |
| 330 | Maintenance station |
| 370 | Stack of media |
| 371 | Top piece of medium |
| 380 | Carriage motor |
| 382 | Carriage guide rail |
| 383 | Encoder fence |
| 384 | Belt |
| 390 | Printer electronics board |
| 392 | Cable connectors |
| 410 | Look-up table |
| 420 | Multitoned image data |
| 430 | Printing data |
| 450 | Image data |
| 461 | Rolling image buffer (at time 1) |
| 462 | Rolling image buffer (at time 2) |
| 463 | Rolling image buffer (at time 3) |
| 464 | Rolling image buffer (at time 4) |
| 470 | Multilevel mask plane (code value 0) |
| 471 | Multilevel mask plane (code value 1) |
| 472 | Multilevel mask plane (code value 2) |
| 481 | Output swath 1 |
| 482 | Output swath 2 |
| 483 | Output swath 3 |
| 484 | Output swath 4 |
| 490 | Printed result |
| 550 | Multitoned image data |
| 571 | Mask plane 1 |
| 572 | Mask plane 2 |
| 573 | Mask plane 3 |
| 574 | Mask plane 4 |
| 575 | Mask plane 5 |
| 576 | Mask plane 6 |
| 577 | Mask plane 7 |
| 578 | Mask plane 8 |

-continued

PARTS LIST

| | |
|---|---|
| 580 | Print buffer |
| 581 | Complete print buffer |
| 621 | Complementary cells |
| 622 | Complementary cells |
| 623 | Complementary cells |
| 624 | Complementary cells |
| 625 | Stacked cell |
| 631 | Complementary cells |
| 632 | Complementary cells |
| 633 | Complementary cells |
| 634 | Complementary cells |
| 635 | Stacked cell |
| 646 | Stacked cell matrix |
| 648 | Stacked cell matrix |
| 676 | Modified mask plane 6 |
| 746 | Modified stacked cell matrix |

The invention claimed is:

1. A method for processing image data including pixels received from an image data source in preparation for multipass printing, comprising a processor for performing the following:

a) multitoning the image data to produce a multitoned image having a multitone image resolution $R_{Mx} \times R_{My}$ dot per inch and a number of multitone level values $L_M$, the multitone image resolution being lower than a printing resolution $R_{Px} \times R_{Py}$ dots per inch, and the number of multitone levels $L_M$ being higher than a number of printing levels $L_P$;

b) using the multitone level of a pixel in the multitoned image to select a plane of a print mask;

c) using the location of the pixel in the multitoned image to select a cell including a plurality of output pixels in the selected plane of the print mask, wherein the output pixels store values representing the number of drops to be printed at corresponding locations for a particular printing pass;

d) copying the selected cell of output pixels to corresponding locations within a print buffer; and e) repeating steps b) through d) for a plurality of pixels in the multitoned image;

wherein the size of each cell is n×m, where $n=R_{Px}/R_{Mx}$ and $m=R_{Py}/R_{My}$, wherein at least of n or m is greater than 1, and wherein the number of multitone level values $L_M=(n \times m) \times (L_P-1)+1$.

2. The method of claim 1, wherein at least one plane of the print mask is constructed such that fewer than 10% of the cells that comprise the plane of the print mask have a data pattern identical to an adjacent cell.

3. The method of claim 1, wherein the print mask is constructed such that adjacent cells in at least one plane of the print mask have different data patterns.

4. The method of claim 1, wherein the multipass printing includes a number of printing passes P, and wherein at least one plane of the print mask is constructed such that P complementary cells combine additively to provide a stacked cell matrix, such that at least one pixel in the stacked cell matrix has a different value than at least one other pixel in the stacked cell matrix.

5. The method of claim 4, wherein the difference between the maximum value and the minimum value in the stacked cell matrix is less than 2.

6. The method of claim 1, wherein the multipass printing includes a number of printing passes P, and wherein at least one plane of the print mask is constructed such that P complementary cells combine additively to provide a stacked cell matrix such that the sum of the data in each stacked cell in the stacked cell matrix is equal to the corresponding multitone level.

7. The method of claim 1, wherein the multipass printing includes a number of printing passes P, and wherein at least one plane of the print mask is constructed such that P complementary cells combine additively to provide a stacked cell matrix such that the sum of the data in each stacked cell in the stacked cell matrix is greater than the corresponding multitone level.

8. The method of claim 1, wherein multipass printing includes a number of printing passes P, and wherein at least one plane of the print is constructed such that P complementary cells combine additively to provide a stacked cell matrix such that no stacked cell in the stacked cell matrix is adjacent to another stacked cell having the same data pattern.

9. The method of claim 1 wherein the multipass printing includes a number of printing passes P and steps a)-e) are applied for each of the P printing passes.

10. The method of claim 1, wherein the image data is color image data comprising a plurality of color planes and steps a)-e) are repeated for each color plane of the image data to be printed.

11. The method of claim 10, wherein different output pixel patterns are printed for at least two different color planes in response to a common multitone level at a given location.

12. The method of claim 1 further including using an inkjet printhead to print the image data in the print buffer.

13. A method for processing image data including pixels received from an image data source in preparation for multipass printing, comprising a processor for performing the following:
a) multitoning the image data to produce a multitone image having a multitone image resolution $R_{Mx} \times R_{My}$ dots pre inch and a number of multitone level values $L_M$, the multitone image resolution being lower than a printing resolution $R_{Px} \times R_{Py}$ dots per inch, and the number of multitone levels $L_M$ being higher than a number of printing levels $L_P$;
b) using the multitone level of a pixel in the multitoned image to select a plane of a print mask;
c) using the location of the pixel in the multitoned image to select a cell including a plurality of output pixels in the selected plane of the print mask, wherein the output pixel store values representing the number of drops to be printed at corresponding locations for a particular printing pass;
d) copying the selected cell of output pixels to corresponding locations within a print buffer; and
e) repeating steps b) through d) for a plurality of pixels in the multitoned image;
wherein the multipass printing includes a number of printing passes P, and wherein at least one plane of the print mask is constructed such that P complementary cells combine additively to provide a stacked cell matrix such that the sum of the data in each stacked cell in the stacked cell matrix is greater than or equal to the corresponding multitone level.

* * * * *